(12) United States Patent
Bosetti et al.

(10) Patent No.: US 10,071,808 B1
(45) Date of Patent: Sep. 11, 2018

(54) AIRCRAFT ICING CONDITIONS DETECTION SYSTEMS AND METHODS

(71) Applicant: THE BOEING COMPANY, Chicago, IL (US)

(72) Inventors: Cris K. Bosetti, Seattle, WA (US); Hosam E. El-Gabalawy, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/598,412

(22) Filed: May 18, 2017

(51) Int. Cl.
*B64D 15/22* (2006.01)
*B64D 15/12* (2006.01)
*B64D 43/02* (2006.01)

(52) U.S. Cl.
CPC .............. *B64D 15/22* (2013.01); *B64D 15/12* (2013.01); *B64D 43/02* (2013.01)

(58) Field of Classification Search
CPC ......... B64D 15/22; B64D 15/12; B64D 43/02
USPC ....................................................... 340/962
See application file for complete search history.

(56) References Cited

U.S. PATENT DOCUMENTS

| | | | |
|---|---|---|---|
| 8,517,601 B2 | 8/2013 | Stothers | |
| 8,907,798 B2 | 12/2014 | Meis | |
| 9,180,972 B2 | 11/2015 | Meis | |
| 2007/0194179 A1* | 8/2007 | Giamati | B64C 9/24 244/134 D |
| 2008/0218385 A1* | 9/2008 | Cook | B64D 15/20 340/962 |
| 2013/0175396 A1* | 7/2013 | Meis | B64D 15/00 244/134 F |
| 2014/0007654 A1* | 1/2014 | Lilie | G01N 25/04 73/25.05 |
| 2014/0166813 A1* | 6/2014 | Greene | B64D 15/20 244/134 F |
| 2015/0346122 A1* | 12/2015 | Stothers | B64D 15/14 702/130 |
| 2016/0169761 A1* | 6/2016 | Campos-Ortega | G01L 11/002 702/50 |
| 2016/0272332 A1* | 9/2016 | Ishida | B64D 15/12 |
| 2017/0174349 A1* | 6/2017 | Povroznik, III | B64D 15/12 |
| 2017/0283077 A1* | 10/2017 | Putt | B64D 15/166 |

\* cited by examiner

*Primary Examiner* — Hirdepal Singh
(74) *Attorney, Agent, or Firm* — Joseph M. Butscher; The Small Patent Law Group, LLC (57) ABSTRACT

An icing conditions detection system is configured to detect icing conditions with respect to an aircraft. The icing conditions detection system includes an icing conditions detector secured to a surface of the aircraft and that is configured to detect liquid water within an air stream through which the aircraft flies. A free stream of atmospheric air passes over the icing conditions detector during flight. An icing conditions determination control unit is communicatively coupled to the icing conditions detector, and is configured to detect a first icing condition and a second icing condition based on at least one icing conditions signal received from the icing conditions detector. The first icing condition differs from the second icing condition.

20 Claims, 3 Drawing Sheets

AIRCRAFT ICING CONDITIONS DETECTION SYSTEMS AND METHODS

FIELD OF THE DISCLOSURE

Embodiments of the present disclosure generally relate to systems and methods for detecting icing conditions during a flight of an aircraft, and, more particularly, to systems and methods for differentiating between different types of icing conditions.

BACKGROUND OF THE DISCLOSURE

Aircraft (such as commercial aircraft) often encounter in-flight icing conditions. Icing on an aircraft may occur when atmospheric conditions cause ice formation on surfaces of the aircraft. Icing conditions may occur when droplets of supercooled liquid water are present. Water is considered supercooled when the water is cooled below a freezing port, but is still in liquid form. Icing conditions may be characterized by the size of the water droplets, the content of liquid water, air temperature, and other parameters.

Most, if not all, commercial aircraft include icing detectors. In response to the detection of icing conditions, the icing detectors are configured to automatically operate ice protection systems or to alert a pilot to do so. The ice protection systems are configured to prevent or remove ice from aircraft parts or surfaces (such as wings, empennages, engine inlets, air data probes, and the like) as well as provide other protective functions through avionics, crew alerting, and/or control laws.

Certain known ice detectors are incapable of detecting different types of icing conditions. For example, such ice detectors are configured to detect one particular type of icing condition, and may therefore be unable to detect a different type of icing condition.

SUMMARY OF THE DISCLOSURE

A need exists for a system and method for differentiating between different types of icing conditions during a flight. In general, a need exists for an efficient system and method of detecting different types of icing conditions during a flight.

With those needs in mind, certain embodiments of the present disclosure provide an icing conditions detection system that is configured to detect icing conditions with respect to an aircraft. The icing conditions detection system includes an icing conditions detector secured to a surface of the aircraft and that is configured to detect liquid water within an air stream through which the aircraft flies. A free stream of atmospheric air passes over the icing conditions detector during flight. An icing conditions determination control unit is communicatively coupled to the icing conditions detector. The icing conditions determination control unit is configured to detect a first icing condition and a second icing condition based on at least one icing conditions signal received from the icing conditions detector. The first icing condition differs from the second icing condition.

In at least one embodiment, the first icing condition is an Appendix C icing condition, and the second icing condition is an Appendix O icing condition. The icing conditions determination control unit is configured to differentiate between the Appendix C icing condition and the Appendix O icing condition.

In at least one embodiment, a speed sensor is configured to detect an air speed of the aircraft. The icing conditions determination control unit is configured to detect the first icing condition and the second icing condition based on the at least one icing conditions signal received from the icing conditions detector and a speed signal indicative of the air speed of the aircraft received from the speed sensor.

In at least one embodiment, an altitude sensor is configured to detect an altitude of the aircraft. The icing conditions determination control unit is configured to detect the first icing condition and the second icing condition based on the at least one icing conditions signal received from the icing conditions detector and an altitude signal indicative of the altitude of the aircraft received from the altitude sensor.

In at least one embodiment, an air temperature sensor is configured to detect a temperature of air surrounding the aircraft. The icing conditions determination control unit is configured to detect the first icing condition and the second icing condition based on the at least one icing conditions signal received from the icing conditions detector and a temperature signal indicative of the temperature of the air received from the temperature sensor.

In at least one embodiment, an angle of attack sensor is configured to detect an angle of attack of the surface of the aircraft. The icing conditions determination control unit is configured to detect the first icing condition and the second icing condition based on the at least one icing conditions signal received from the icing conditions detector and an angle of attack signal indicative of the angle of attack of the surface of the aircraft received from the angle of attack sensor.

Power signal fluctuations of the icing conditions detector may be used to detect presence of water impingement on the icing conditions detector.

In at least one embodiment, the icing conditions determination control unit is configured to detect water content of the air stream, and analyze the water content of the atmospheric air in relation to one or more aircraft parameters to determine presence of one or both of the first icing condition and the second icing condition. The aircraft parameters may include a speed of the aircraft, altitude of the aircraft, angle of attack of the surface of the aircraft, and atmospheric pressure and temperature.

In at least one embodiment, the icing conditions detector includes a plurality of chordwise zones. A first portion of the plurality of chordwise zones is within a first icing conditions envelope. A second portion of the plurality of chordwise zones is within a second icing conditions envelope having portions outside of the first icing conditions envelope.

Certain embodiments of the present disclosure provide an icing conditions detection method that is configured to detect icing conditions with respect to an aircraft. The icing conditions detection method includes detecting liquid water within an air stream through which the aircraft flies by an icing conditions detector that is secured to a surface of the aircraft, passing a free stream of atmospheric air over the icing conditions detector during flight, communicatively coupling an icing conditions determination control unit to the icing conditions detector, and detecting, by the icing conditions determination control unit, a first icing condition (such as an Appendix C icing condition) and a second icing condition (such as an Appendix O icing condition) based on at least one icing conditions signal received from the icing conditions detector.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide systems and methods for detecting in-flight icing conditions experienced by an aircraft. The systems and methods include one or more icing conditions detectors located on a surface such as a wing, or other surface of the aircraft. The icing conditions detectors are subjected to a free stream atmospheric water catch. The icing conditions detectors may be water sensors that are configured to detect the presence of liquid water within atmospheric air. At least one of the icing conditions detectors includes multiple chordwise zones on a detection surface. In at least one embodiment, the zones are maintained at a constant temperature. In at least one embodiment, power fluctuations of the zones indicate a presence of water impingement. Combined with air temperature and aircraft speed, the power fluctuations can be used to identify icing conditions. Through an analysis of an angle of attack of the detection surface along with power signals from each individual zone, the systems and methods are configured to differentiate between different icing conditions.

In at least one embodiment, one type of icing condition is described in Appendix C of Part 25 and Part 29 of Title 14 of the United States Code of Federal Regulations (hereafter referred to as "Appendix C"). Appendix C is used to select values of icing-related cloud variables for the design of in-flight ice protection systems for aircraft. Appendix C is further described in "Icing Design Envelopes (14 CFR Parts 25 and 29, Appendix C) Converted to a Distance-Based Format," Jeck, Richard K., DOT/FAA/AR-00/30 (April 2002). Appendix C icing conditions relate to cloud variables.

Another type of icing condition is described in Appendix O of Part 25 of Title 14 of the United States Code of Federal Regulations (hereafter referred to as "Appendix O"). Appendix O is used to select values in relation to freezing drizzle and freezing rain for the design of in-flight ice protection systems for aircraft. Appendix O is further described in "Operational Impact of § 25.1420 and Appendix O," Sultan, Roger (February 2015). Appendix O icing conditions relate to freezing rain and freezing drizzle. Appendix O was released as a new certification standard in 2015.

Embodiments of the present disclosure provide systems and methods that are configured to differentiate between Appendix C and Appendix O icing conditions. As such, the systems and methods allow for aircraft to be certified by the U.S. Federal Aviation Administration (FAA) in relation to both Appendix C and Appendix O.

Certain embodiments of the present disclosure provide systems and methods that use multiple zones and logic to differentiate between different types of icing conditions on aircraft flight surfaces. The different types of icing conditions include Appendix C and Appendix O icing conditions.

Certain embodiments of the present disclosure provide a method for detecting icing conditions on at least one flight surface of an aircraft during a flight. The method includes coupling at least one icing conditions detector to the at least one flight surface. During a flight, a free stream of atmospheric air passes over the icing conditions detector(s). The method also includes detecting water content of the atmospheric air, analyzing the water content of the atmospheric air in relation to a speed of the aircraft, altitude of the aircraft and atmospheric pressure and temperature, and identifying a potential icing condition on respective flight surfaces.

Figure 1:
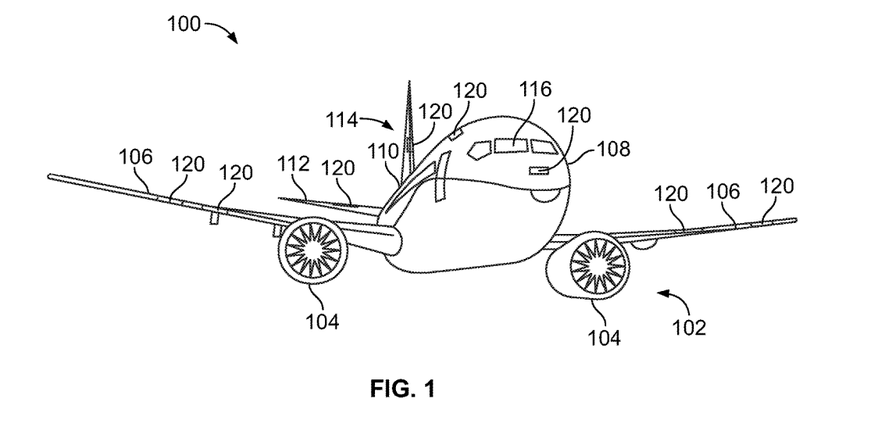
FIG. 1 is a diagrammatic representation of a front perspective view of an aircraft, according to an embodiment of the present disclosure.

In at least one embodiment, the icing condition detector(s) include a plurality of chordwise zones on the flight surface(s). The zones are maintained at a substantially constant temperature. Electrical power fluctuation may be used to detect water impingement. A location of each chordwise zone may be independently analyzed to identify a potential icing condition FIG. 1 is a diagrammatic representation of a front perspective view of the aircraft 100, according to an embodiment of the present disclosure. The aircraft 100 includes a propulsion system 102 that may include two turbofan engines 814, for example. Optionally, the propulsion system 102 may include more engines 104 than shown. The engines 104 are carried by wings 106 of the aircraft 100. In other embodiments, the engines 104 may be carried by a fuselage 108 and/or an empennage 110. The empennage 110 may also support horizontal stabilizers 112 and a vertical stabilizer 114. The fuselage 108 of the aircraft 100 defines an internal cabin, includes a cockpit 116, and may also include one or more work sections (for example, galleys, personnel carry-on baggage areas, and the like), one or more passenger sections (for example, first class, business class, and coach sections), and an aft section in which an aft rest area assembly may be positioned.

A plurality of icing conditions detectors 120 are secured to the aircraft 100. The icing conditions detectors 120 are secured to the wings 106, the fuselage 108, and the empennage 114. Optionally, the icing conditions detectors 120 may be secured to less than all of the wings 106, the fuselage 108, and the empennage 114. For example, the icing conditions detectors 120 may be secured to the leading edges of the wings 106. In general, the icing conditions detectors 120 may be secured to any surface of the aircraft 100. The icing conditions detector 120 may be or include a liquid water sensor that is configured to detect liquid water within air.

Figure 2:
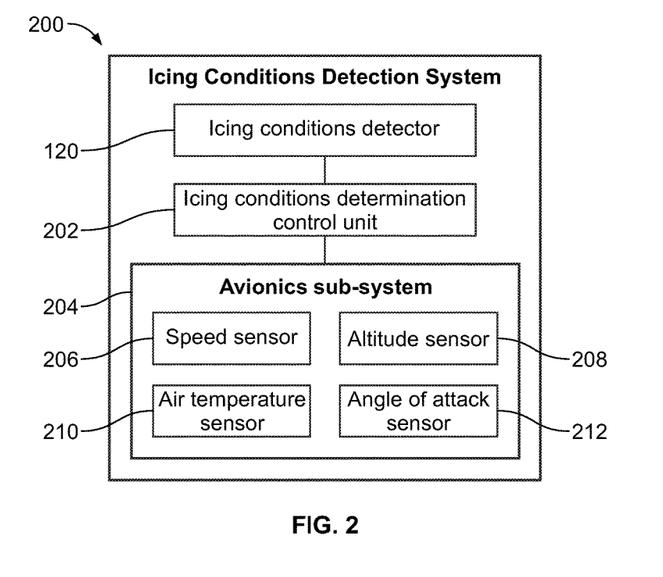
FIG. 2 illustrates a schematic diagram of an icing conditions detection system, according to an embodiment of the present disclosure.

FIG. 2 illustrates a schematic diagram of an icing conditions detection system 200, according to an embodiment of the present disclosure. The icing conditions detection system 200 includes one or more icing conditions detectors 120, such as those shown and described with respect to FIG. 1. An icing conditions determination control unit 202 is in communication with the icing conditions detector(s) 120 and an avionics sub-system 204 of the aircraft 100 (shown in FIG. 1). The icing conditions determination control unit 202 may be operatively coupled to each of the icing conditions detector(s) 120 and the avionics sub-system 204 through one or more wired or wireless connections.

The icing conditions determination control unit 202 may be within the aircraft 100, such as within a cockpit. In at least one embodiment, the icing conditions determination control unit 202 may be part of a flight computer of the aircraft 100. For example, the icing conditions determination control unit 202 and the avionics sub-system 204 may be part of the flight computer. In at least one other embodiment, the icing conditions determination control unit 202 may be separate and distinct from the flight computer.

In at least one embodiment, the avionics sub-system 204 includes a speed sensor 206, an altitude sensor 208, an air temperature sensor 210, and an angle of attack sensor 212. Optionally, the avionics sub-system 204 may include more or less than the sensors 206, 208, 210, and 212. In at least one embodiment, at least one of the sensors 206, 208, 210, or 212 may be separate and distinct from the avionics sub-system 204.

The speed sensor 206 is configured to detect a current air speed of the aircraft and output a speed signal indicative of the air speed of the aircraft. The altitude sensor 208 (such as an altimeter) is configured to detect a current altitude of the aircraft and output an altitude signal indicative of the altitude of the aircraft.

The temperature sensor 210 (which may include one or more thermometers) is configured to detect a current air temperature outside of the aircraft and output an air temperature signal indicative of the current air temperature outside of the aircraft. That is, the temperature sensor 210 is configured to detect the ambient air temperature surrounding the aircraft. The temperature sensor 210 may be positioned proximate to the icing conditions detector 120. For example, the temperature sensor 210 may be directly coupled to the icing conditions detector 120 to detect air temperature at the location of the icing conditions detector 120.

The angle of attack sensor 212 is configured to detect an angle of attack of a surface of the aircraft during flight and output an angle of attack signal indicative of the angle of attack of the surface. For example, the angle of attack sensor 212 may be or include an angle of attack vane, an accelerometer, and/or the like coupled to the surface. The angle of attack sensor 212 is configured to detect an angle of attack of a surface on which the icing conditions detector 120 is secured. Angle of attack is a reference angle defined as the angle between a free stream of air that an aircraft is flying through and a reference chord line of a wing of the aircraft.

In operation, the icing conditions determination control unit 202 receives an icing conditions signal (for example, a water detection signal) that is output from the icing conditions detector 120. The icing conditions signal is indicative of icing conditions on the surface of the aircraft on which the icing conditions detector 120 is mounted.

The icing conditions determination control unit 202 also receives signals output from the avionics sub-system 204. For example, the icing conditions determination control unit 202 receives the speed signal from the speed sensor 206. The speed signal indicates a current air speed of the aircraft. The icing conditions determination control unit 202 also receives the altitude signal from the altitude sensor 208. The altitude signal indicates a current altitude of the aircraft. The icing conditions determination control unit 202 also receives the air temperature signal from the air temperature sensor 210. The air temperature signal indicates the current air temperature surrounding the aircraft. The icing conditions determination control unit 202 also receives the angle of attack signal from the angle of attack sensor 212. The angle of attack signal indicates an angle of attack of a surface on which the icing conditions detector 120 is mounted.

The icing conditions determination control unit 202 determines icing conditions experienced by the aircraft based on the icing conditions signal and one or more of the speed signal, the altitude signal, the air temperature signal, and/or the angle of attack signal. As described below, the icing conditions determination control unit 202 is able to distinguish between Appendix C and Appendix O icing conditions based on analysis of the icing conditions and one or more aircraft parameters, such as indicated by one or more of the speed signal, the altitude signal, the air temperature signal, and/or the angle of attack signal.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the icing conditions determination control unit 202 may be or include one or more processors that are configured to control operation of the icing conditions detection system 200, as described herein.

The icing conditions determination control unit 202 is configured to execute a set of instructions that are stored in one or more data storage units or elements (such as one or more memories), in order to process data. For example, the icing conditions determination control unit 202 may include or be coupled to one or more memories. The data storage units may also store data or other information as desired or needed. The data storage units may be in the form of an information source or a physical memory element within a processing machine.

The set of instructions may include various commands that instruct the icing conditions determination control unit 202 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the icing conditions determination control unit 202. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the icing conditions determination control unit 202 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
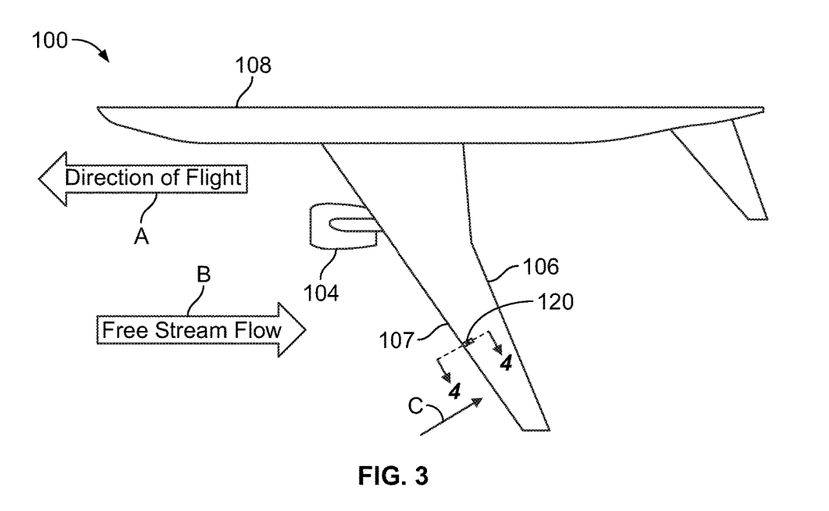
FIG. 3 is a diagrammatic representation of a simplified top view of a wing extending from a fuselage of an aircraft, according to an embodiment of the present disclosure.

FIG. 3 is a diagrammatic representation of a simplified top view of a wing 106 extending from the fuselage 108 of the aircraft 100, according to an embodiment of the present disclosure. As shown, the aircraft 100 flies in a forward direction A, while a free stream flow of air flows over the aircraft in an opposite direction B.

As shown in FIG. 3, the icing conditions detector 120 is located at a leading edge 107 of the wing 106. Local air flows over the icing conditions detector 120 normal to the leading edge of the wing 106 in the direction of arrow C.

Figure 4:
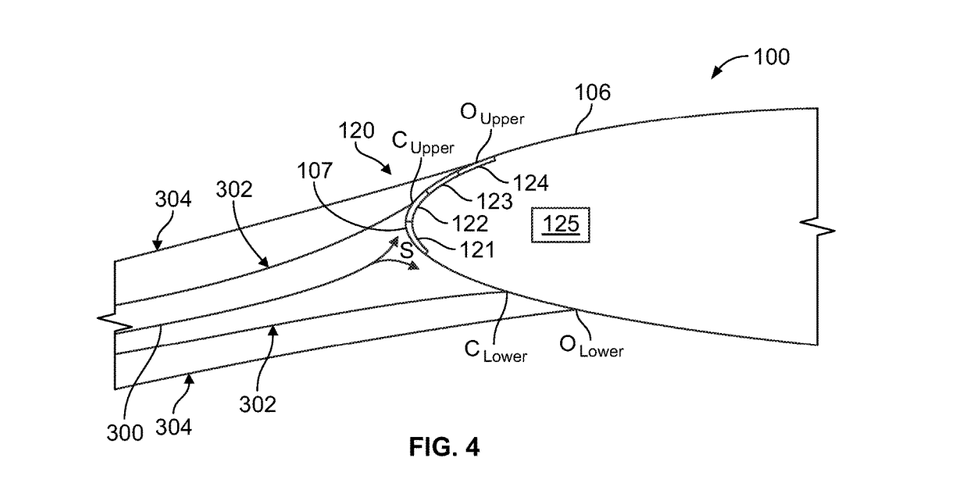
FIG. 4 is a diagrammatic representation of a cross-sectional view of a wing of an aircraft through line 4-4 of FIG. 3, according to an embodiment of the present disclosure.

FIG. 4 is a diagrammatic representation of a cross-sectional view of the wing 106 of the aircraft 100 through line 4-4 of FIG. 3, according to an embodiment of the present disclosure. During flight, supercooled water 300 contained in icing clouds impinges on the leading edge 107 of the wing 106. The drop trajectories of the water 300 are a function of drop size, aircraft speed, aircraft geometry, aircraft weight, and/or the like. The water 300 follows the airstream (direction C, shown in FIG. 3) and impinges on the wing 106. The icing conditions detector 120 detects the presence of the water 300 within the airstream. For example, the icing conditions detector 120 may be a sensor that is configured to detect the presence of liquid water.

Referring to FIGS. 2-4, the icing conditions determination control unit 202 determines the speed of the aircraft 100 (via the speed signal received from the speed sensor 206), the altitude of the aircraft 100 (via the altitude signal received from the altitude sensor 208), the angle of attack of the wing 106 (via the angle of attack signal received from the angle of attack sensor 212), and aircraft weight (which may be known and stored in memory). Based on the speed of the aircraft 100, the altitude of the aircraft 100, the angle of attack of the wing 106, the aircraft weight, and the water impinging on the wing 106 as detected by the icing conditions detector 120, the icing conditions determination control unit 202 calculates drop trajectories for Appendix C icing conditions within an Appendix C envelope 302 between an upper impingement limit $C_{Upper}$ and a lower impingement limit $C_{Lower}$ for Appendix C icing conditions.

In at least one embodiment, the icing conditions determination control unit 202 is coupled to a memory that stores icing parameters (such as combinations of air speed, temperature, angle of attack, and the like at which icing will occur) for Appendix C and Appendix O. The icing conditions determination control unit 202 analyzes the combination of current flight conditions (as represented by the current speed, altitude, air temperature, angle of attack) and the stored icing parameters of Appendix C and Appendix O. Based on the current flight conditions and the icing parameters of Appendix C, the icing conditions determination control unit determines the Appendix C envelope 302 between the upper impingement limit $C_{Upper}$ and the lower impingement limit $C_{Lower}$ for Appendix C icing conditions, as well as an Appendix O envelope 304 between an upper impingement limit $O_{Upper}$ and a lower impingement limit $O_{Lower}$ for Appendix O icing conditions.

Appendix O includes a definitional component that includes larger droplets as compared to Appendix C. The larger droplets of Appendix O, under certain flight conditions, have a more ballistic trajectory than the smaller drops of Appendix C, and may result in impingement limits that include the upper impingement limit $C_{Upper}$ and the lower impingement limit $C_{Lower}$ for Appendix C.

In at least one embodiment, the icing conditions detector 120 includes four chordwise zones 121, 122, 123, and 124 located on the leading edge 107 of the wing 106. As noted, however, the icing conditions detector 120 may be located at various other locations of the aircraft 100, such as the fuselage and/or the empennage. The icing conditions detector 120 may include more or less than four chordwise zones.

In general, Appendix C icing conditions occur upstream on a wing from Appendix O icing conditions. As such, one or more zones of the icing conditions detector 120 that are configured to detect Appendix O icing conditions are located downstream (aft) on the leading edge 107 of the wing 106 in relation to the zones that are configured to detect Appendix C icing conditions.

The icing conditions detector 120 may operate analogous to a hot film anemometer. For example, each surface zone 121, 122, 123, and 124 may be maintained at a constant temperature (such as through one or more integral or separate heaters 125) through active monitoring and adjustment of the power supplied to the zones 121, 122, 123, and 124. For example, the icing conditions determination control unit 202 and/or another monitoring control unit may monitor and adjust power to the zones 121, 122, 123, and 124.

For basic ice conditions detection, the icing conditions determination control unit 202 analyzes the speed of the aircraft 100 (as detected through the speed signal), the air temperature (as detected through the air temperature sensor 210), and whether the aircraft 100 is flying through an airstream including supercooled liquid water (as detected by the icing conditions detector 120) conducive to icing conditions. The icing conditions determination control unit 202 may independently apply such analysis to all of the zones 121, 122, 123, and 124.

The icing conditions determination control unit 202 differentiates between the icing environments of Appendix C and Appendix O. As shown in FIG. 4, the icing conditions determination control unit may control the zones 121, 122, and 123 of the icing conditions detector 120 to operate the heater(s) 125 to maintain constant temperature of the zones 121, 122, and 123 sufficiently high to make the combination of zones 121, 122, and 123 fully evaporative for Appendix C icing conditions. That is, the icing conditions determination control unit 202 may operate the heater 125 to ensure that the combined zones 121, 122, and 123 are heated to a temperature that evaporates liquid water after initial impingement. Because the liquid water evaporates, the evaporated water does not run from the zone 123 downstream on the wing 106.

As shown, the zone 124 is positioned below the $O_{Upper}$ and the $C_{Upper}$. Accordingly, when the zone 124 detects liquid water, the icing conditions determination control unit 202 determines the presence of Appendix O icing conditions. Similarly, when the zones 121, 122, and/or 123 detect the presence of liquid water (which is evaporated after initial impingement due to the heat applied to the zones 121, 122, and 123, as noted), the icing conditions determination control unit 202 determines Appendix C icing conditions. Because the size of water droplets as defined in Appendix C are smaller than those defined in Appendix O, the heat applied to the zones 121, 122, and 123 sufficient to evaporate the water droplets. However, the size of the water droplet as defined in Appendix O is larger than that defined in Appendix C. As such, while the heat applied to the zones 121, 122, and 123 may be sufficient to evaporate the smaller water droplets as defined in Appendix C, but not great enough to evaporate the larger water droplets as defined in Appendix O. In this manner, when liquid water is detected by the zone 124 between $C_{Upper}$ and $O_{Upper}$, the icing conditions determination control unit 202 determines that Appendix O icing conditions are present.

The zone 124 may also be maintained at a constant temperature in a similar fashion as the other chordwise zones 121, 122, and 123. However, the zone 124 does not need to be maintained at temperature required to be fully evaporative.

Additionally, the icing conditions determination control unit 202 may analyze the angle of attack of the wing 106, as detected by the angle of attack sensor 212. The angle of attack of the wing changes between cruise, climb, decent, and bank angles, for example. Accordingly, the impingement limits will change relative to the leading edge 107 based on the angle of attack of the wing 106. The icing conditions determination control unit 202 adapts the zones 121, 122, and 123, and 124 based on the angle of attack of the wing. For example, the angle of attack of the wing 106 may locate more than the zone 124 between the $C_{Upper}$ and $O_{Upper}$ impingement limits. The icing conditions determination control unit 202 may then adjust the heat applied to the zones 121, 122, 123, and 124 such that only the zones between $C_{Upper}$ and $C_{Lower}$ are heated to evaporate liquid water as defined by Appendix C.

In at least one embodiment, the icing conditions determination control unit 202 analyzes a mission profile of the aircraft 100 and determines a full range of flight conditions and icing conditions. The conditions may include airspeed, altitude, weight, resulting angle of attack of the aircraft 100, horizontal tail angle, and the like. In at least one embodiment, the icing conditions determination control unit 202 may use computational fluid dynamics (CFD) to calculate some or all of the flow field (aerodynamic) information for the aircraft 100. The icing conditions determination control unit 202 may apply the CFD solutions with respect to an icing code, including droplet sizes and/or other conditions consistent with Appendix C and Appendix O. The icing conditions determination control unit 202 then applies Appendix C icing conditions to determine where the water droplets impinge on the leading edge 107 to determine the impingement limits $C_{Upper}$ and $C_{Lower}$. The icing conditions determination control unit 202 then determines the upper and lower impingement limits $C_{Upper}$ and $C_{Lower}$ for Appendix C for a given set of flight parameters. From the impingement limits $C_{Upper}$ and $C_{Lower}$, the icing conditions determination control unit 202 determines that any water that impinges on the wing above or below the impingement limits $C_{Upper}$ and $C_{Lower}$ indicates Appendix O conditions.

In at least one embodiment, the icing conditions determination control unit analyzes an airplane mission profile, which includes combinations of speed, weight, center of gravity, and/or the like. The conditions representing extremes in speed and angle of attack are considered along with typical representative normal operating conditions, which provide scenarios that envelope an entire range of water impingement. Using these conditions and airplane configurations (flaps stowed and/or deployed), CFD computer simulations are completed, thereby generating aerodynamic flow field information around and on the airplane configuration. The CFD solutions are then used as input conditions into a droplet trajectory prediction code. The droplet trajectory code is applied to a range of droplet sizes and conditions to simulate the range of impingement limits on the airplane configuration.

Figure 5:
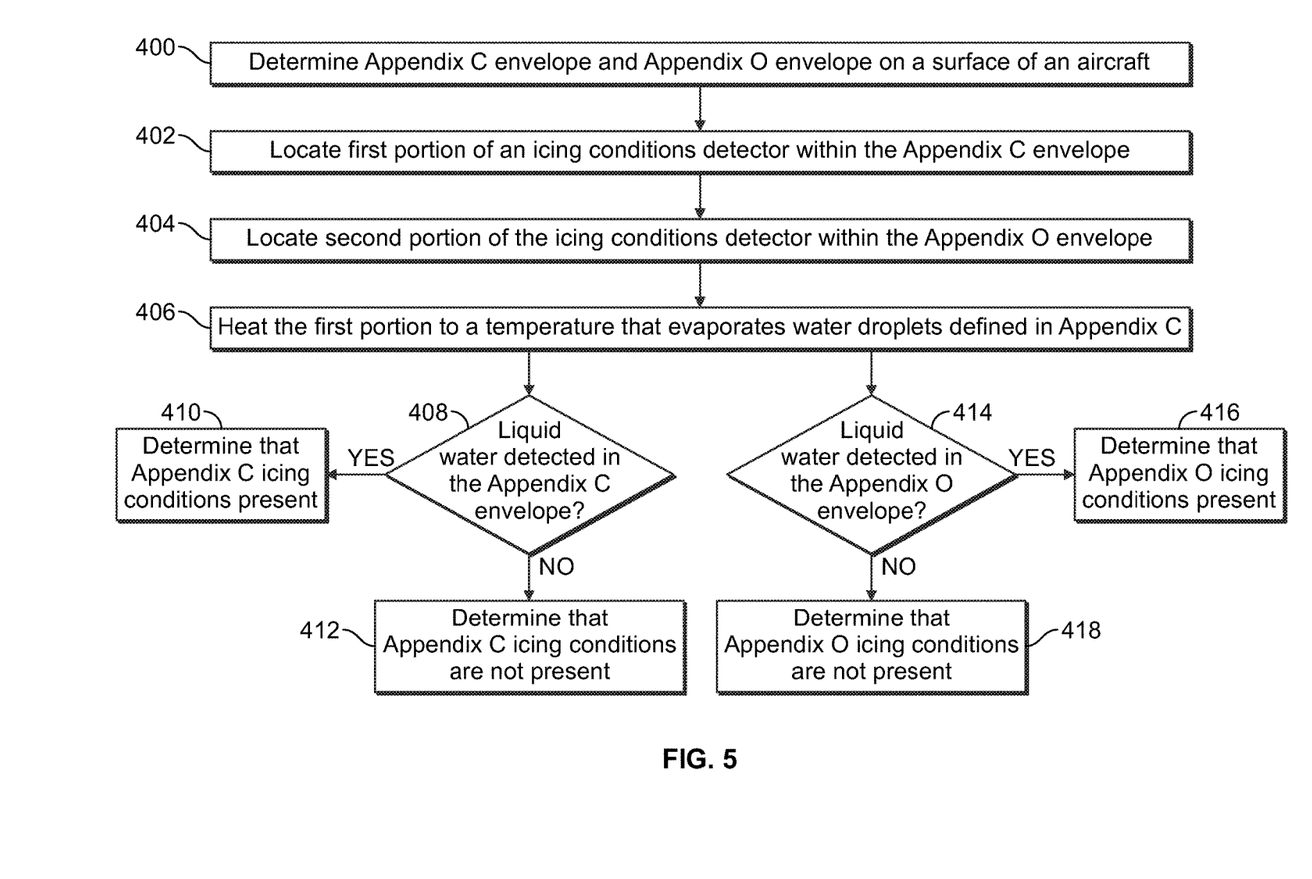
FIG. 5 illustrates a flow chart of a method of detecting Appendix C and Appendix O icing conditions on a surface of an aircraft, according to an embodiment of the present disclosure.

FIG. 5 illustrates a flow chart of a method of detecting Appendix C and Appendix O icing conditions on a surface of an aircraft, according to an embodiment of the present disclosure. Referring to FIGS. 1-5, the method beings at 400, at which the Appendix C envelope 302 and the Appendix O envelope 304 are determined with respect to a surface (such as the wing 106) of the aircraft 100. In at least one embodiment, the icing conditions determination control unit 202 determines the Appendix C envelope and the Appendix O envelope based on information stored in a memory coupled to the icing conditions determination control unit 202 related to Appendix C and Appendix O, as well as one or more current aircraft parameters, including a current air speed of the aircraft 100, a current altitude of the aircraft 100, air temperature surrounding the aircraft 100, air pressure, and an angle of attack of the surface of the aircraft 100 The icing conditions determination control unit 202 may continually determine and/or update the Appendix C envelope and the Appendix O envelope based on changes to the current aircraft parameters.

At 402, a first portion (including one more zones) of the icing conditions detector 402 is located within the Appendix C envelope 302. For example, the icing conditions determination control unit 202 may locate the first portion of the icing conditions detector 402 based on the determined location of the Appendix C envelope 302.

At 404, a second portion (including one more zones) of the icing conditions detector 402 that differs from the first portion is located within the Appendix O envelope 304. For example, the icing conditions determination control unit 202 may locate the second portion of the icing conditions detector 402 based on the determined location of the Appendix O envelope 304.

Next, at 406, the first portion within the Appendix C envelope 302 is heated to a temperature that evaporates Appendix C water droplets, the size of which are defined in Appendix C. Then, at 408, the icing conditions determination control unit 202 determines whether liquid water is detected in the Appendix C envelope 302. For example, even though the first portion is heated to evaporate the liquid water defined in Appendix C, the icing conditions detector 120 still detects the liquid water as it initially impinges upon the first portion. After the liquid water as defined in Appendix C initially impinges on the first portion and is subsequently evaporated, there is no liquid water as defined in Appendix C to flow onto aft portions of the surface.

If liquid water is detected in the Appendix C envelope at 408, the method proceeds to 410, at which the icing conditions determination control unit 202 determines that Appendix C icing conditions are present. If, however, liquid water is not detected at 408, the method proceeds from 408 to 412, at which the icing conditions determination control unit 202 determines that Appendix C icing conditions are not present.

Concurrently with 408, at 410, the icing conditions determination control unit 202 determines whether liquid water is detected in the Appendix O envelope 304, such as a portion that is outside of the Appendix C envelope 302. Because liquid water droplets as defined in Appendix O are larger than those defined in Appendix C, the heat used to evaporate the larger Appendix O water droplets is unable to evaporate the liquid water droplets as defined in Appendix O. As such, the larger Appendix O water droplets flow downstream and onto the second portion.

If liquid water is detected in the Appendix O envelope at 414, the method proceeds to 416, at which the icing conditions determination control unit 202 determines that Appendix O icing conditions are present. If, however, liquid water is not detected at 414, the method proceeds from 414 to 418, at which the icing conditions determination control unit 202 determines that Appendix O icing conditions are not present.

As described above, embodiments of the present disclosure provide systems and methods for differentiating between different types of icing conditions during a flight. Embodiments of the present disclosure provide efficient and effective systems and methods of detecting different types of icing conditions (such as Appendix C icing conditions and Appendix O icing conditions) during a flight.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An icing conditions detection system that detects icing conditions with respect to an aircraft, the icing conditions detection system comprising:
    an icing conditions detector secured to a surface of the aircraft and that detects liquid water within an air stream through which the aircraft flies, wherein a free stream of atmospheric air passes over the icing conditions detector during flight; and
    an icing conditions determination control unit communicatively coupled to the icing conditions detector, wherein the icing conditions determination control unit detects a first icing condition and a second icing condition based on at least one icing conditions signal received from the icing conditions detector, wherein the first icing condition differs from the second icing condition, wherein the icing conditions determination control unit is configured to ensure that the icing conditions detector is heated to a temperature that evaporates first water droplets associated with the first icing condition but not second water droplets associated with the second icing condition to differentiate between the first icing condition and the second icing condition.

2. The icing conditions detection system of claim 1, wherein the first icing condition is an Appendix C icing condition, wherein the second icing condition is an Appendix O icing condition, and wherein the icing conditions determination control unit differentiates between the Appendix C icing condition and the Appendix O icing condition.

3. The icing conditions detection system of claim 1, further comprising a speed sensor that detects an air speed of the aircraft, wherein the icing conditions determination control unit detects the first icing condition and the second icing condition based on the at least one icing conditions signal received from the icing conditions detector and a speed signal indicative of the air speed of the aircraft received from the speed sensor.

4. The icing conditions detection system of claim 1, further comprising an altitude sensor that detects an altitude of the aircraft, wherein the icing conditions determination control unit detects the first icing condition and the second icing condition based on the at least one icing conditions signal received from the icing conditions detector and an altitude signal indicative of the altitude of the aircraft received from the altitude sensor.

5. The icing conditions detection system of claim 1, further comprising an air temperature sensor that detects a temperature of air surrounding the aircraft, wherein the icing conditions determination control unit detects the first icing condition and the second icing condition based on the at least one icing conditions signal received from the icing conditions detector and a temperature signal indicative of the temperature of the air received from the temperature sensor.

6. The icing conditions detection system of claim 1, further comprising an angle of attack sensor that detects an angle of attack of the surface of the aircraft, wherein the icing conditions determination control unit detects the first icing condition and the second icing condition based on the at least one icing conditions signal received from the icing conditions detector and an angle of attack signal indicative of the angle of attack of the surface of the aircraft received from the angle of attack sensor.

7. The icing conditions detection system of claim 1, wherein power signal fluctuations of the icing conditions detector are used to detect presence of water impingement on the icing conditions detector.

8. The icing conditions detection system of claim 1, wherein the icing conditions determination control unit:
  detects water content of the air stream, and
  analyzes the water content of the atmospheric air in relation to one or more aircraft parameters to determine presence of one or both of the first icing condition and the second icing condition.

9. The icing conditions detection system of claim 8, wherein the one or more aircraft parameters comprises a speed of the aircraft, altitude of the aircraft, angle of attack of the surface of the aircraft, and atmospheric pressure and temperature.

10. The icing conditions detection system of claim 1, wherein the icing conditions detector comprises a plurality of chordwise zones, wherein a first portion of the plurality of chordwise zones is within a first icing conditions envelope, and wherein a second portion of the plurality of chordwise zones is within a second icing conditions envelope having portions outside of the first icing conditions envelope.

11. An icing conditions detection method that detects icing conditions with respect to an aircraft, the icing conditions detection method comprising:
  detecting liquid water within an air stream through which the aircraft flies by an icing conditions detector that is secured to a surface of the aircraft;
  passing a free stream of atmospheric air over the icing conditions detector during flight;
  communicatively coupling an icing conditions determination control unit to the icing conditions detector; and
  detecting, by the icing conditions determination control unit, a first icing condition and a second icing condition based on at least one icing conditions signal received from the icing conditions detector, wherein the detecting, by the icing condition control unit, comprises ensuring that the icing conditions detector is heated to a temperature that evaporates first water droplets associated with the first icing condition but not second water droplets associated with the second icing condition to differentiate between the first icing condition and the second icing condition.

12. The icing conditions detection method of claim 11, wherein the first icing condition is an Appendix C icing condition, wherein the second icing condition is an Appendix O icing condition, and wherein the detecting, by the icing conditions determination control unit, comprises differentiating between the Appendix C icing condition and the Appendix O icing condition.

13. The icing conditions detection method of claim 11, further comprising:
  detecting an air speed of the aircraft by a speed sensor,
  wherein the detecting, by the icing conditions determination control unit, comprises detecting the first icing condition and the second icing condition based on the at least one icing conditions signal received from the icing conditions detector and a speed signal indicative of the air speed of the aircraft received from the speed sensor.

14. The icing conditions detection method of claim 11, further comprising:
  detecting an altitude of the aircraft by an altitude sensor,
  wherein the detecting, by the icing conditions determination control unit, comprises detecting the first icing condition and the second icing condition based on the at least one icing conditions signal received from the icing conditions detector and an altitude signal indicative of the altitude of the aircraft received from the altitude sensor.

15. The icing conditions detection method of claim 11, further comprising:
  detecting a temperature of air surrounding the aircraft by an air temperature sensor,
  wherein the detecting, by the icing conditions determination control unit, comprises detecting the first icing condition and the second icing condition based on the at least one icing conditions signal received from the icing conditions detector and a temperature signal indicative of the air temperature received from the air temperature sensor.

16. The icing conditions detection method of claim 11, further comprising:
  detecting an angle of attack of the surface of the aircraft by an angle of attack sensor
  wherein the detecting, by the icing conditions determination control unit, comprises detecting the first icing condition and the second icing condition based on the at least one icing conditions signal received from the icing conditions detector and an angle of attack signal indicative of the angle of attack of the surface received from the angle of attack sensor.

17. The icing conditions detection method of claim 11, wherein the detecting, by the icing conditions determination control unit, comprises detecting power signal fluctuations of the icing conditions detector to detect presence of water impingement on the icing conditions detector.

18. The icing conditions detection method of claim 11, wherein the detecting, by the icing conditions determination control unit, comprises:
  detecting water content of the air stream; and
  analyzing the water content of the atmospheric air in relation to one or more aircraft parameters to determine presence of one or both of the first icing condition and the second icing condition.

19. The icing conditions detection method of claim 11, further comprising:
  locating a first portion of a plurality of chordwise zones of the icing conditions detector within a first icing conditions envelope; and
  locating a second portion of the plurality of chordwise zones within a second icing conditions envelope having portions outside of the first icing conditions envelope.

20. An icing conditions detection system that detects icing conditions with respect to an aircraft, the icing conditions detection system comprising:

an icing conditions detector secured to a surface of the aircraft and that detects liquid water within an air stream through which the aircraft flies, wherein a free stream of atmospheric air passes over the icing conditions detector during flight, wherein power signal fluctuations of the icing conditions detector are used to detect presence of water impingement on the icing conditions detector, wherein the icing conditions detector comprises a plurality of chordwise zones, wherein a first portion of the plurality of chordwise zones is within a first icing conditions envelope, and wherein a second portion of the plurality of chordwise zones is within a second icing conditions envelope having portions outside of the first icing conditions envelope;

a speed sensor that detects an air speed of the aircraft;

an altitude sensor that detects an altitude of the aircraft;

an air temperature sensor that detects a temperature of air surrounding the aircraft;

an angle of attack sensor that is configured to detect an angle of attack of the surface of the aircraft; and an icing conditions determination control unit communicatively coupled to each of the icing conditions detector, the speed sensor, the altitude sensor, the air temperature sensor, and the angle of attack sensor, wherein the icing conditions determination control unit detects an Appendix C icing condition and an Appendix O icing condition based on at least one icing conditions signal received from the icing conditions detector, a speed signal indicative of the air speed of the aircraft received from the speed sensor, an altitude signal indicative of the altitude of the aircraft received from the altitude sensor, a temperature signal indicative of the temperature of the air received from the temperature sensor, and an angle of attack signal indicative of the angle of attack of the surface received from the angle of attack sensor, and wherein the icing conditions determination control unit differentiates between the Appendix C icing condition and the Appendix O icing condition.

* * * * *